(12) United States Patent
Takeda et al.

(10) Patent No.: US 10,938,025 B2
(45) Date of Patent: Mar. 2, 2021

(54) NEGATIVE ELECTRODE ACTIVE MATERIAL PARTICLES FOR LITHIUM ION SECONDARY BATTERY AND METHOD OF PRODUCING THE SAME

(71) Applicant: TOYOTA JIDOSHA KABUSHIKI KAISHA, Toyota (JP)

(72) Inventors: Kazuhisa Takeda, Toyota (JP); Keisuke Ohara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 15/959,902

(22) Filed: Apr. 23, 2018

(65) Prior Publication Data

US 2018/0309118 A1   Oct. 25, 2018

(30) Foreign Application Priority Data

Apr. 25, 2017  (JP) .............................. JP2017-086157

(51) Int. Cl.
*H01M 4/00*     (2006.01)
*H01M 4/36*     (2006.01)
*H01M 4/587*    (2010.01)
*H01M 4/485*    (2010.01)
*C01G 23/00*    (2006.01)
*C01B 32/05*    (2017.01)
*H01M 4/62*     (2006.01)
(Continued)

(52) U.S. Cl.
CPC ............ *H01M 4/366* (2013.01); *C01B 32/05* (2017.08); *C01G 23/005* (2013.01); *H01M 4/485* (2013.01); *H01M 4/587* (2013.01); *H01M 4/625* (2013.01); *C01P 2004/61* (2013.01); *C01P 2004/80* (2013.01); *C01P 2006/40* (2013.01); *H01M 10/0525* (2013.01); *H01M 2004/027* (2013.01)

(58) Field of Classification Search
CPC .......... C01P 2004/61; C01P 2006/40; H01M 4/366; H01M 10/0525; H01M 4/625
See application file for complete search history.

(56) References Cited

U.S. PATENT DOCUMENTS

2011/0189544 A1\* 8/2011 Kim ...................... H01M 4/485
                                                 429/231.1
2012/0288766 A1\* 11/2012 Lee ......................... H01M 4/38
                                                    429/223

(Continued)

FOREIGN PATENT DOCUMENTS

CN    103299459 A    9/2013
CN    103492316 A    1/2014
(Continued)

*Primary Examiner* — Cynthia H Kelly
*Assistant Examiner* — Monique M Wills
(74) *Attorney, Agent, or Firm* — Sughrue Mion, PLLC

(57) ABSTRACT

Negative electrode active material particles for a lithium ion secondary battery include base material particles and a coating. The coating covers a surface of the base material particles. The base material particles contain a first carbon material. The coating contains lithium titanate and a second carbon material. When a ratio of an intensity of a D band to an intensity of a G band in a laser Raman spectrum is set as an R value, the second carbon material has a larger R value than the first carbon material.

7 Claims, 3 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 2013/0157127 A1* | 6/2013 | Hirose | B60L 53/65 |
| | | | 429/211 |
| 2013/0288106 A1 | 10/2013 | Chang et al. | |
| 2014/0057166 A1 | 2/2014 | Yokoyama et al. | |
| 2014/0065479 A1 | 3/2014 | Yamada et al. | |
| 2016/0218355 A1* | 7/2016 | Li | H01M 4/366 |
| 2017/0117535 A1* | 4/2017 | Yoon | H01M 4/134 |

FOREIGN PATENT DOCUMENTS

| | | |
|---|---|---|
| CN | 103518279 A | 1/2014 |
| CN | 103682332 A | 3/2014 |
| JP | 2009-252421 A | 10/2009 |
| JP | 2011-515012 A | 5/2011 |
| JP | 2012-049001 A | 3/2012 |
| JP | 2013-201058 A | 10/2013 |
| JP | 2015-046219 A | 3/2015 |
| WO | 2010/064755 A1 | 6/2010 |

\* cited by examiner

NEGATIVE ELECTRODE ACTIVE MATERIAL PARTICLES FOR LITHIUM ION SECONDARY BATTERY AND METHOD OF PRODUCING THE SAME

INCORPORATION BY REFERENCE

The disclosure of Japanese Patent Application No. 2017-086157 filed on Apr. 25, 2017 including the specification, drawings and abstract is incorporated herein by reference in its entirety.

BACKGROUND

1. Technical Field

The present disclosure relates to negative electrode active material particles for a lithium ion secondary battery and a method of producing the same.

2. Description of Related Art

Japanese Unexamined Patent Application Publication No. 2009-252421 (JP 2009-252421 A) discloses negative electrode active material particles (hereinafter referred to as "negative electrode active material particles" in some cases) for a lithium ion secondary battery in which the surface of carbon-based particles is covered with lithium titanate.

SUMMARY

As negative electrode active material particles for a lithium ion secondary battery, carbon-based particles are known. In general, an organic solvent is used for an electrolytic solution of a lithium ion secondary battery. In the electrolytic solution, when insertion and elimination reactions of lithium (Li) ions occur in carbon-based particles, a surface coating derived from decomposition products of the electrolytic solution is formed on the surface of the carbon-based particles. This surface coating is called a solid electrolyte interface (SEI). It is necessary for the SEI to have high Li ion conductivity and long-term stability, and the like.

In the related art, when a high-quality SEI is formed by improving an electrolytic solution, high performance and a longer lifespan of batteries have been achieved. However, the SEI derived from an electrolytic solution gradually becomes thicker when the battery is used (charging and discharging), and a battery resistance of the lithium ion secondary battery can increase.

In JP 2009-252421 A, the surface of carbon-based particles being covered with lithium titanate is proposed. Thereby, contact between the electrolytic solution and the carbon-based particles is prevented, and reductive decomposition of the electrolytic solution is expected to be prevented. That is, formation of the SEI derived from the electrolytic solution is expected to be prevented. In addition, lithium titanate has Li ion conductivity. That is, lithium titanate is thought to be an alternative to the SEI.

However, in JP 2009-252421 A, lithium titanate is synthesized by a liquid phase reaction. An oxide synthesized by a liquid phase reaction is thought to have a particle form. Thus, contact between lithium titanate and carbon-based particles is thought to be point contacts. When contact between lithium titanate and carbon-based particles is point contacts, there are fewer conduction paths for Li ions and the battery resistance can increase.

The present disclosure provides negative electrode active material particles for a lithium ion secondary battery whose surface is covered with lithium titanate and in which increase in battery resistance is prevented.

A first aspect of the present disclosure relates to negative electrode active material particles for a lithium ion secondary battery. The negative electrode active material particles include base material particles and a coating. The coating covers a surface of the base material particles. The base material particles contain a first carbon material. The coating contains lithium titanate and a second carbon material. When a ratio of an intensity of a D band to an intensity of a G band in a laser Raman spectrum is set as an R value, the second carbon material has a larger R value than the first carbon material.

The R value is an index value that indicates a degree of progress of graphitization. A larger R value indicates a lesser progress of graphitization. In the negative electrode active material particles of the present disclosure, the base material particles contain a first carbon material. The coating contains a second carbon material. The first carbon material is a carbon material with a relatively higher degree of progress of graphitization (graphitization is more likely to have progressed than in the second carbon material). The second carbon material is a carbon material with a relatively lower degree of progress of graphitization (graphitization is relatively less likely to have progressed than in the first carbon material).

Since the graphitization of the first carbon material is relatively progressed, Li ions can be reversely inserted into the first carbon material and desorbed. The coating contains the second carbon material in addition to lithium titanate. Since the graphitization of the second carbon material is relatively not progressed, the second carbon material is assumed to have an affinity for both the lithium titanate and the base material particles. The coating is a mixture of lithium titanate and the second carbon material. Therefore, the second carbon material is expected to supplement contact points between lithium titanate and the base material particles. Thereby, contact between lithium titanate and the base material particles is changed from point contacts to surface contact, and it is expected that then there will be more conduction paths for Li ions.

In addition, in the second carbon material, anisotropy of Li ion conduction is expected to be weaker than that of the first carbon material. This is because graphitization is less likely to have progressed in the second carbon material than in the first carbon material. Thus, conduction of Li ions in many directions is expected in the second carbon material. That is, more conduction paths for Li ions are expected.

Lithium titanate has low electron conductivity. Thus, when the base material particles are covered with lithium titanate, the electron conductivity of the negative electrode active material particles is thought to be lowered. However, the coating also contains a second carbon material. According to the second carbon material, a reduction in electron conductivity is expected to be reduced.

Accordingly, it is possible to provide negative electrode active material particles for a lithium ion secondary battery whose surface is covered with a coating containing lithium titanate and in which increase in battery resistance is prevented.

In the first aspect, the second carbon material may have an R value of 0.38 or more and 0.53 or less. Thereby, an increase in battery resistance is expected to be prevented.

A second aspect of the present disclosure relates to a method of producing negative electrode active material particles for a lithium ion secondary battery. The production method includes the following (A) to (C).

(A) Preparing base material particles containing a first carbon material, (B) Oxidizing a surface of the base material particles so that a hydrophilic group is introduced onto the surface of the base material particles; and (C) Forming a coating containing lithium titanate and a second carbon material on the surface of the base material particles onto which the hydrophilic group is introduced by a hydrothermal reaction, wherein the coating is formed to cover the surface of the base material particles, and when a ratio of an intensity of a D band to an intensity of a G band in a laser Raman spectrum is set as an R value, the second carbon material has a larger R value than the first carbon material.

In the production method of the present disclosure, first, a hydrophilic group is introduced onto the surface of the base material particles. Next, a coating is formed on the surface of the base material particles by a hydrothermal synthesis method. When the hydrophilic group is introduced, the surface of the base material particles is assumed to have an affinity for water. Therefore, the hydrothermal reaction is thought to easily progress uniformly on the entire surface of the base material particles. Thereby, the coating is expected to be uniformly formed on the entire surface of the base material particles.

The coating is formed to include lithium titanate and a second carbon material. Therefore, the second carbon material is expected to supplement contact points between lithium titanate and the base material particles. That is, contact between lithium titanate and base material particles is expected to be changed from point contacts to surface contact. In addition, in the coating containing the second carbon material, conduction of Li ions is expected to occur in many directions. In addition, the second carbon material is expected to prevent a reduction in electron conductivity due to lithium titanate.

Accordingly, negative electrode active material particles for a lithium ion secondary battery whose surface is covered with a coating containing lithium titanate and in which increase in battery resistance is prevented can be produced.

In the second aspect, the method of producing negative electrode active material particles for a lithium ion secondary battery may further include the following (D).

(D) Heating the coating such that there is less second carbon material on the outermost surface of the coating. Thus, contact between the second carbon material and the electrolytic solution is expected to be prevented. In addition, lithium titanate is expected to prevent contact between the first carbon material and the electrolytic solution. Due to a synergistic effect of these, a reductive decomposition reaction of the electrolytic solution is expected to be prevented.

The second carbon material may be synthesized by a hydrothermal reaction of an organic compound. When the organic compound that will become a second carbon material is actively supplied, synthesis of the second carbon material can be promoted.

The organic compound may be ethylene glycol. Ethylene glycol (EG) has high hydrophilicity. Thereby, the second carbon material is expected to be uniformly produced on the entire surface of the base material particles.

The lithium titanate may be synthesized by a hydrothermal reaction between a lithium compound and a titanium alkoxide. For example, lithium titanate may be synthesized by a hydrothermal reaction between lithium hydroxide (LiOH) and a titanium alkoxide.

The titanium alkoxide may be tetra-n-butyl titanate. For example, lithium titanate may be synthesized by a hydrothermal reaction between LiOH and tetra-n-butyl titanate.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments (also referred to as the "present embodiment" in this specification) of the present disclosure will be described below. However, the following description does not limit the scope of the claims.

In this specification, for example "at least one of A and B" includes "only A," "only B" and "both A and B."

<Negative Electrode Active Material Particle>

Figure 1:
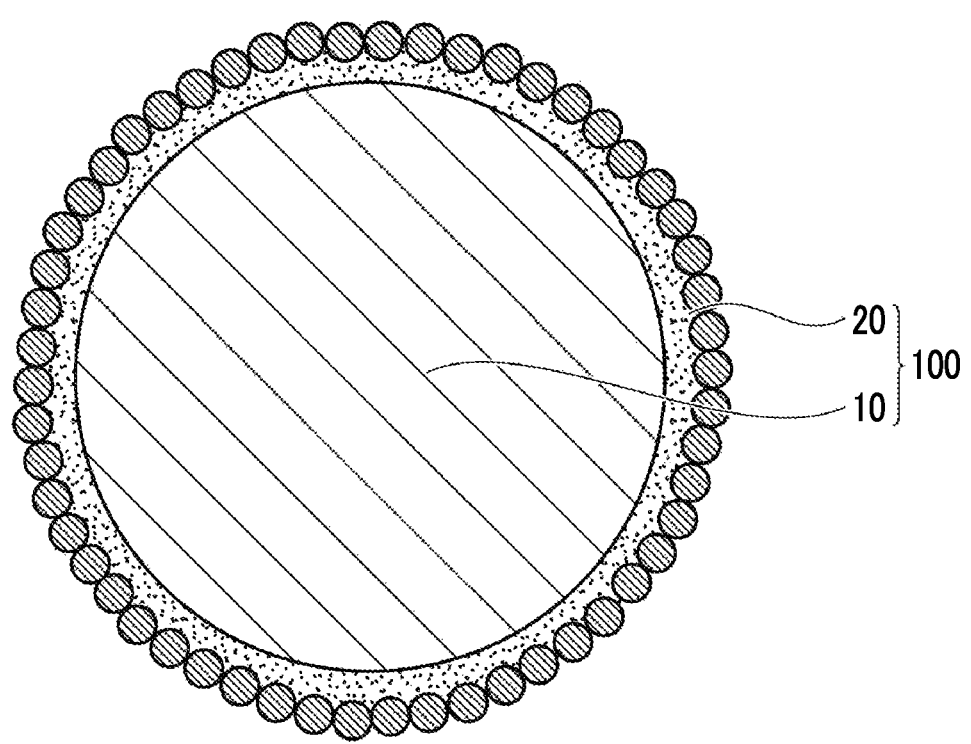
FIG. 1 is a conceptual sectional view showing a configuration of negative electrode active material particles of the present embodiment.

FIG. 1 is a conceptual sectional view showing a configuration of negative electrode active material particles of the present embodiment. Negative electrode active material particles 100 include base material particles 10 and a coating 20. The negative electrode active material particles 100 may have, for example, an average particle size of 1 µm to 30 µm, an average particle size of 5 µm to 20 µm, or an average particle size of 5 µm to 15 µM.

The "average particle size" in this specification refers to a particle size at which a cumulative volume becomes 50% of the total volume in a volume-based particle size distribution measured by a laser diffraction scattering method. The shape of the negative electrode active material particles 100 is not particularly limited. The negative electrode active material particles 100 may have, for example, a spherical shape, a clumped shape, a fusiform shape, or a scaly shape.

<Base Material Particles>

The base material particles 10 are a core of the negative electrode active material particles 100. The base material particles 10 include a first carbon material. The base material particles 10 may be particles that substantially contain only the first carbon material. The base material particles 10 may have, for example, an average particle size of 0.5 µm to 29.5 µm, an average particle size of 4.5 µm to 19.5 µm, or an average particle size of 4.5 µm to 14.5 µm. The shape of the base material particles 10 is not particularly limited. The base material particles 10 may have, for example, a spherical shape, a clumped shape, a fusiform shape, or a scaly shape.

The first carbon material has a relatively higher degree of progress of graphitization than a second carbon material. That is, the first carbon material has a smaller R value than the second carbon material. The R value is an index value that indicates a degree of progress of graphitization. The R value can be measured by a laser Raman spectrophotometer.

In this specification, a ratio of an intensity of a D band to an intensity of a G band in a laser Raman spectrum is an R value. The G band is considered to be a peak derived from a graphite crystal. The G band appears near 1580 cm$^{-1}$. The D band is considered to be a peak derived from amorphous carbon. The D band appears near 1360 cm$^{-1}$. Depending on samples, the G band and the D band may shift by about ±30 cm$^{-1}$. A higher R value indicates a lower degree of progress of graphitization (graphitization is less likely to have progressed relatively). The R value is also denoted as "$I_{1360}/I_{1580}$." The R value can be obtained by performing measurement at least three times on one powder sample. An arithmetic mean of at least three measurement results can be used. About 0.1 g of the powder sample can be used for one measurement, for example.

The R value of an ideal graphite crystal is considered to be zero. The first carbon material may have, for example, an R value of 0 or more and 0.2 or less. According to the progress of graphitization of the first carbon material, an increase in reversible capacity can be expected. The first carbon material may have, for example, an R value of 0.01 or more and, an R value of 0.05 or more, or an R value of 0.1 or more. The first carbon material may have, for example, an R value of 0.17 or less. The first carbon material may be, for example, artificial graphite, or natural graphite.

<Coating>

The coating 20 is a shell of the negative electrode active material particles 100. The coating 20 covers the surface of the base material particles 10. The coating 20 may cover the entire surface of the base material particles 10 or a part of the surface of the base material particles 10. However, when the coverage by the coating 20 is higher, an effect of reducing reductive decomposition of the electrolytic solution is thought to be stronger. Therefore, desirably, the coating 20 substantially covers the entire surface of the base material particles 10.

The coating 20 may have, for example, a thickness of 0.5 µm to 1 µm. The thickness of the coating 20 can be measured in a sectional microscope image of the negative electrode active material particles 100. The thickness of the coating 20 is measured at at least three parts. An arithmetic mean of thicknesses of at least three parts can be used as a measurement result.

Figure 2:
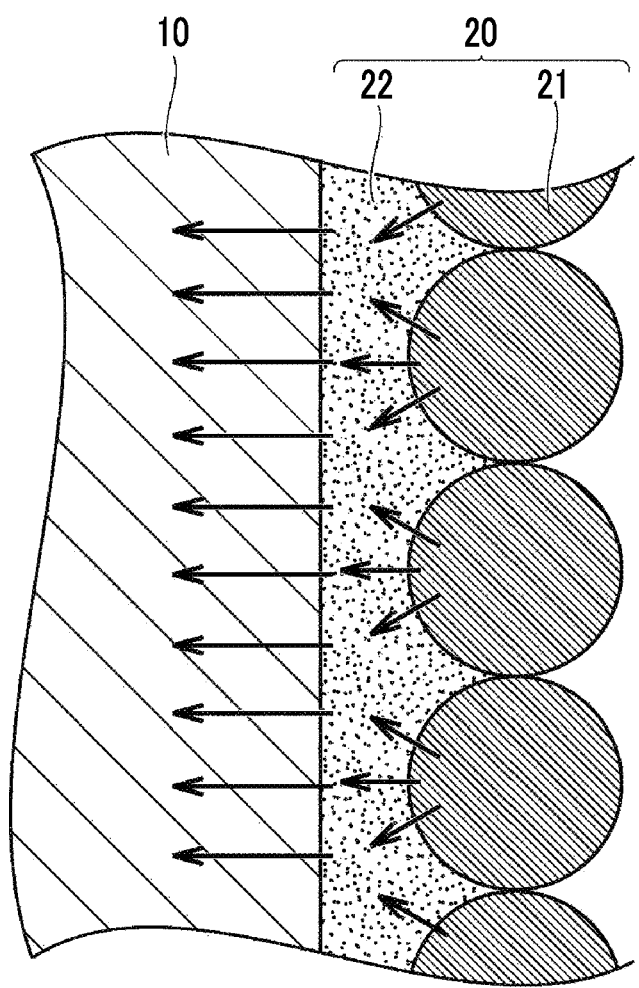
FIG. 2 is a conceptual sectional view showing a main part of negative electrode active material particles of the present embodiment.

FIG. 2 is a conceptual sectional view showing a main part of negative electrode active material particles of the present embodiment. The coating 20 includes lithium titanate 21 and a second carbon material 22. The lithium titanate 21 is in the form of particles. At least a part of the lithium titanate 21 is exposed to the outermost surface of the coating 20. When there is more of the lithium titanate 21 exposed to the outermost surface, there is relatively less of the second carbon material 22 exposed to the outermost surface. When there is less of the second carbon material 22 exposed to the outermost surface, reductive decomposition of the electrolytic solution is thought to be unlikely to occur. Thus, the lithium titanate 21 may constitute substantially the entire outermost surface of the coating 20.

Since the graphitization of the second carbon material 22 is relatively not progressed, the second carbon material is assumed to have an affinity for both the lithium titanate 21 and the base material particles 10. The coating 20 is a mixture of the lithium titanate 21 and the second carbon material 22. Thus, contact points between the lithium titanate 21 and the base material particles 10 can be supplemented using the second carbon material 22. Thus, there are many conduction paths for Li ions and an increase in battery resistance can be prevented.

In addition, in the second carbon material 22, the anisotropy of Li ion conduction is expected to be weaker than that of the first carbon material (the base material particles 10). This is because graphitization is less likely to have progressed in the second carbon material 22 than in the first carbon material. Thus, in the second carbon material 22, the conduction of Li ions can be expected to occur in many directions. Thus, more conduction paths for Li ions can be expected. In FIG. 2, conduction paths for Li ions are schematically indicated by arrows.

The lithium titanate 21 has low electron conductivity. Thus, when the base material particles 10 are covered with the lithium titanate 21, electron conductivity is thought to be lowered. However, the coating 20 also contains the second carbon material 22. According to the second carbon material 22, a reduction in electron conductivity can be expected to be reduced.

The second carbon material 22 has a relatively lower degree of progress of graphitization than the first carbon material. That is, the second carbon material 22 has a larger R value than the first carbon material. The second carbon material 22 may have, for example, an R value of 0.38 or more and 0.53 or less. The second carbon material 22 may have, for example, an R value of 0.44 or more. The second carbon material may have, for example, an R value of 0.51 or less. The second carbon material 22 can be produced by, for example, a hydrothermal synthesis method.

The "lithium titanate" in this specification includes Li (lithium), Ti (titanium), and O (oxygen) at an atomic ratio known in the related art. The lithium titanate 21 may be, for example, $Li_4Ti_5O_{12}$, $LiTi_2O_4$, or $Li_2TiO_3$. The coating 20 may include two or more types of lithium titanate. That is, the lithium titanate 21 may be at least one selected from the group consisting of $Li_4Ti_5O_{12}$, $LiTi_2O_4$, and $Li_2TiO_3$.

A crystal structure of lithium titanate can be identified by, for example, an X ray diffraction (XRD) method. Lithium titanate may have, for example, a spinel structure.

<Method of Producing Negative Electrode Active Material Particle>

Figure 3:
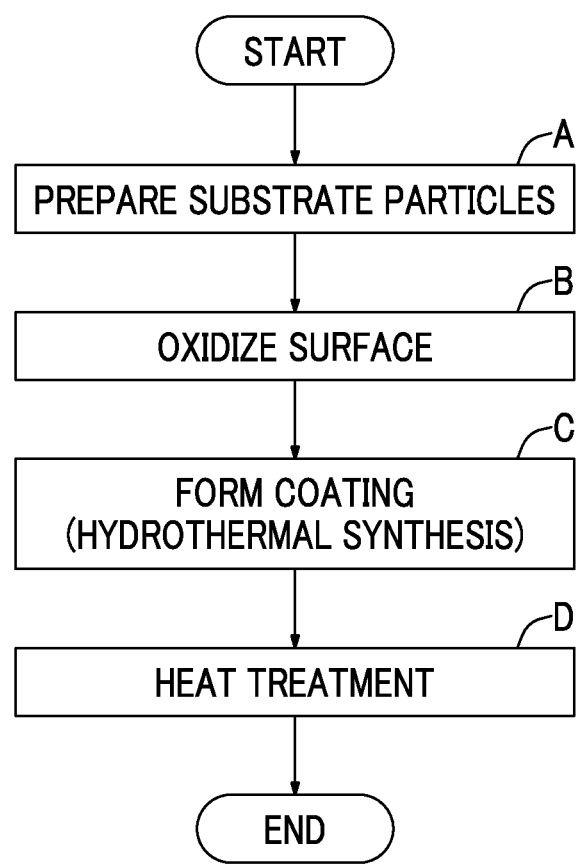
FIG. 3 is a flowchart showing an overview of a method of producing negative electrode active material particles of the present embodiment.

A method of producing negative electrode active material particles of the present embodiment will be described below. FIG. 3 is a flowchart showing an overview of the method of producing negative electrode active material particles of the present embodiment. The production method of the present embodiment includes "(A) preparing base material particles," (B) surface oxidation," and "(C) forming a coating." The production method of the present embodiment may further include "(D) heat treatment." The production method of the present embodiment will be described below in order.

<(A) Preparing Base Material Particle>

The production method of the present embodiment includes preparing the base material particles 10 containing a first carbon material. Details of the base material particles 10 and the first carbon material are as described above. Here, the base material particles 10 may be purchased or the base material particles 10 may be synthesized.

<(B) Surface Oxidation>

The production method of the present embodiment includes oxidizing a surface of the base material particles 10 so that a hydrophilic group is introduced onto the surface of the base material particles 10.

The "hydrophilic group" in this specification refers to an atomic group that can form a hydrogen bond with a water molecule. The hydrophilic group may be, for example, a hydroxyl group (OH), a carboxy group (COOH), or a carbonyl group (C=O). One type of hydrophilic group may be introduced or two or more types of hydrophilic group may be introduced. When a hydrophilic group is introduced onto the surface of the base material particles 10, the coating 20 is expected to be uniformly formed.

An oxidation method is not particularly limited. For example, it is conceivable that the base material particles 10 be heated in a strong acid such as nitric acid. A concentration of the nitric acid may be, for example, about 50 mass % to 70 mass %. A heating temperature may be, for example, about 50° C. to 70° C. A heating time may be, for example, about 1 hour to 24 hours, about 3 hours to 12 hours, or about 4 hours to 8 hours. When the base material particles 10 are oxidized in nitric acid, the base material particles may be washed with water after oxidation.

<(C) Forming Coating>

The production method of the present embodiment includes forming the coating 20 including the lithium titanate 21 and the second carbon material 22 on the surface of the base material particles 10 onto which the hydrophilic group is introduced by a hydrothermal reaction. The coating 20 is formed to cover the surface of the base material particles 10.

In the present embodiment, the lithium titanate 21 and the second carbon material 22 can be synthesized at the same time by a hydrothermal reaction. Thus, the coating 20 is thought to be a mixture of the lithium titanate 21 and the second carbon material 22. For example, a predetermined autoclave may be used for the hydrothermal reaction. A reaction temperature may be, for example, about 100° C. to 200° C., or about 150 to 200° C. A reaction time may be, for example, about 24 hours to 120 hours, about 24 hours to 72 hours, or about 30 hours to 50 hours.

In order to promote synthesis of the second carbon material 22, it is desirable to actively supply an organic compound that will become a second carbon material to a reaction field (the surface of the base material particles 10). That is, the second carbon material 22 can be synthesized by a hydrothermal reaction of the organic compound. The organic compound that will become the second carbon material 22 is not particularly limited. The organic compound may be, for example, ethylene glycol (EG), propylene glycol (PG), diethylene glycol (DEG), or butanetriol (BTO). One type of organic compound may be used alone or two or more types of organic compound may be used in combination. That is, the organic compound may be at least one selected from the group including EG, PG, DEG, and BTO. Since EG has high hydrophilicity, the second carbon material 22 is then expected to be uniformly produced on the entire surface of the base material particles 10.

An organic compound such as EG may be dissolved in water in advance. An amount of the second carbon material 22 produced can be adjusted via an amount of the organic compound supplied. An amount of the second carbon material 22 produced can be adjusted via, for example, a proportion of the organic compound with respect to a total amount of the organic compound and water. A proportion of the organic compound with respect to a total amount of the organic compound and water may be, for example, 10 mass % or more and 70 mass % or less, 10 mass % or more and 60 mass % or less, 10 mass % or more and 40 mass % or less, or 20 mass % or more and 40 mass % or less. Thus, an appropriate amount of the second carbon material 22 can be produced.

The lithium titanate 21 may be produced by, for example, a hydrothermal reaction between a lithium compound and a titanium alkoxide. As the lithium compound, for example, LiOH, and lithium carbonate ($Li_2CO_3$) may be exemplified. The titanium alkoxide is not particularly limited. The titanium alkoxide may be, for example, tetra-n-butyl titanate, tetraethyl titanate, or tetraisopropyl titanate. One type of titanium alkoxide may be used alone or two or more types of titanium alkoxide may be used in combination. That is, the titanium alkoxide may be at least one selected from the group including tetra-n-butyl titanate, tetraethyl titanate, and tetraisopropyl titanate.

<(D) Heat Treatment>

The production method of the present embodiment may further include heating the coating 20 so that there is less of the second carbon material 22 on the outermost surface of the coating 20. When there is less of the second carbon material 22, the lithium titanate 21 is thought to be exposed to the outermost surface of the coating 20. Thus, a reduction reaction of the electrolytic solution is expected to be prevented.

According to the heat treatment, at least a part of the second carbon material 22 present on the outermost surface of the coating 20 can be oxidatively decomposed. The heat treatment may be performed, for example, in an inert atmosphere or an oxygen-containing atmosphere. When an amount of the second carbon material 22 produced is relatively small, a heat treatment may be performed in an inert atmosphere or an oxygen-containing atmosphere. When an amount of the second carbon material 22 produced is relatively large, a heat treatment is performed in an inert atmosphere, and a heat treatment may be then additionally performed in an oxygen-containing atmosphere.

That is, in the present embodiment, heating the coating 20 may include at least one of (i) heating the coating 20 in an inert atmosphere and (ii) heating the coating 20 in an oxygen-containing atmosphere.

The inert atmosphere is not particularly limited. The inert atmosphere may be, for example, a nitrogen ($N_2$) atmosphere, an argon (Ar) atmosphere, or a vacuum atmosphere. A heat treatment temperature in an inert atmosphere may be, for example, a temperature higher than a temperature during the hydrothermal reaction in which the coating 20 is formed. A heat treatment temperature in an inert atmosphere may be, for example, about 200° C. to 800° C., about 400° C. to 800° C., or about 500° C. to 700° C. A heat treatment time in an inert atmosphere may be, for example, about 2 hours to 14 hours or about 6 hours to 10 hours.

The oxygen-containing atmosphere is not particularly limited. The oxygen-containing atmosphere may be, for example, an air atmosphere. A heat treatment temperature in the oxygen-containing atmosphere may be, for example, a temperature higher than a temperature during the hydrothermal reaction in which the coating 20 is formed. A heat treatment temperature in the oxygen-containing atmosphere may be, for example, about 200° C. to 450° C., about 300° C. to 450° C., or about 350° C. to 450° C. However, when a heat treatment temperature in the oxygen-containing atmosphere is 500° C. or higher, a carbon material other than the outermost surface may be oxidatively decomposed. When a carbon material other than the outermost surface is oxidatively decomposed, a reversible capacity may be reduced.

Accordingly, the negative electrode active material particles of the present embodiment can be produced. As described above, in the negative electrode active material particles of the present embodiment, when a ratio of an intensity of the D band to an intensity of the G band in a laser Raman spectrum is set as an R value, the second carbon material 22 has a higher R value than the first carbon material.

Examples will be described below. However, the following examples do not limit the scope of the claims. In this specification, for example, a sample in which No. is marked with "*" such as "No. *1" is a comparative example. For example, a sample in which No. is not marked with "*" such as "No. 1" is an example.

<No. 1>
1. (A) Preparing Base Material Particles
Artificial graphite with an average particle size of 10 μm was prepared. That is, base material particles containing a first carbon material (artificial graphite) were prepared.
2. (B) Surface Oxidation
Here, 200 g of the base material particles were put into 500 ml of nitric acid (concentration of 60 mass %). The nitric acid was heated to 60° C. The base material particles were stirred in the nitric acid at 60° C. for 6 hours. Thereby, the surface of the base material particles was oxidized and a hydrophilic group was thought to be introduced onto the surface of the base material particles.

After stirring for 6 hours, the base material particles were filtered off. The base material particles were washed with deionized water. Washing was performed until a pH of the washing solution (deionized water) became neutral.
3. (C) Forming Coating
The following materials were prepared.
Titanium alkoxide (ROTi): tetra-n-butyl titanate (TNBT)
Organic compound: ethylene glycol (EG)
Lithium compound: lithium hydroxide (LiOH)
Here, 10.3 g of TNBT, 0.6 g of LiOH, and 3 g of EG were mixed together in a glove box for 12 hours. Thereby, a first dispersion solution was prepared.

Base material particles subjected to the surface oxidation were prepared. Here, 25 g of the base material particles, 3 g of EG, and 54.5 g of deionized water were mixed together sufficiently. Thereby, a second dispersion solution was prepared. The first dispersion solution was removed from the glove box. The first dispersion solution and the second dispersion solution were mixed together sufficiently. Thereby, a raw material liquid was prepared.

An autoclave having an internal volume of 100 ml was prepared. The raw material liquid was sealed in the autoclave. A coating containing lithium titanate and a second carbon material was formed by a hydrothermal reaction. A reaction temperature was set to 175° C. A reaction time was set to 40 hours.

After 40 hours, a product was collected. The product was washed with deionized water. After washing, the product was dried. Accordingly, negative electrode active material particles (No. 1) were produced.
4. (D) Heat Treatment
The negative electrode active material particles were heated in a nitrogen atmosphere at 600° C. for 8 hours. That is, the coating was heated in an inert atmosphere. Thereby, the second carbon material was thought to be reduced on the outermost surface of the coating.

<No. 2>
Negative electrode active material particles were produced in the same manner as in No. 1 except that a first dispersion solution contained 5 g of EG and a second dispersion solution contained 5 g of EG. In No. 2, a proportion of EG with respect to the total amount of EG and water was changed. In No. 2, such a proportion was 20 mass %. Here, the proportion of EG shown in the following Table 1 was rounded off to the first decimal place.

<No. 3>
Negative electrode active material particles were produced in the same manner as in No. 1 except that a first dispersion solution contained 5 g of EG, a second dispersion solution contained 5 g of EG, and the second dispersion solution contained 36 g of deionized water.

<No. 4>
Negative electrode active material particles were produced in the same manner as in No. 1 except that a first dispersion solution contained 5 g of EG, a second dispersion solution contained 32 g of EG, and the second dispersion solution contained 25 g of deionized water.

<No. 5>
Negative electrode active material particles were obtained in the same manner as in No. 1 except that a first dispersion solution contained 5 g of EG, a second dispersion solution contained 41 g of EG, and the second dispersion solution contained 20 g of deionized water. In addition, the negative electrode active material particles were heated in an air atmosphere at 400° C. for 2 hours. That is, a coating was heated in an oxygen-containing atmosphere.

<No. *1>
Untreated artificial graphite was used as negative electrode active material particles. The artificial graphite had an average particle size of 10 μm. No. *1 was a comparative example in which no coating was formed.

<No. *2>
In the same manner as in No. 1, base material particles subjected to surface oxidation were prepared. Here, 25 g of the base material particles, 10.3 g of TNBT, 0.6 g of LiOH, and 57 g of deionized water were mixed together sufficiently. Thereby, a raw material liquid was prepared. The raw material liquid was sealed in an autoclave. Then, negative electrode active material particles were produced in the same manner as in No. 1. No. *2 was a comparative example in which the coating contained no second carbon material.

<Evaluation>
1. Analysis of Negative Electrode Active Material Particles
Surfaces of the negative electrode active material particles of Nos. 1 to 5, and No. *2 were observed under an electron microscope (SEM). In all the samples, parts in which artificial graphite (base material particle) was exposed to the surface of the negative electrode active material particles were substantially not observed.

The surfaces of the negative electrode active material particles were analyzed using an energy dispersive X-ray fluorescence spectrometer (EDX). Detection elements were mainly carbon (C), oxygen (O), and titanium (Ti). Here, lithium (Li) was not in a detection range.

The negative electrode active material particles of Nos. 1 to 5, and No. *2 were subjected to XRD. In all the negative electrode active material particles, mainly, a spectrum including graphite and lithium titanate ($Li_4Ti_5O_{12}$) was observed. Although slight, distinctive features other than this was detected. In Nos. 1 to 5, an increase in background was observed compared to No. *1.

A section sample of negative electrode active material particles of No. 3 was prepared. The section sample was observed under SEM. Thereby, a coating with a thickness of 0.5 μm to 1 μm was confirmed.

An R value of the negative electrode active material particles of No. *1 (R value of the first carbon material) was measured using a laser Raman spectrophotometer. The R value was 0.16.

The negative electrode active material particles of No. *2 were stirred in a hydrogen peroxide solution. The negative electrode active material particles were filtered off and dried. Thereby, lithium titanate was thought to be dissolved in the hydrogen peroxide solution and removed. Then, the R value (R value of the first carbon material) was measured. The R value was 0.17.

The negative electrode active material particles of Nos. 1 to 5 were stirred in a hydrogen peroxide solution. The negative electrode active material particles were filtered off and dried. Thereby, lithium titanate was thought to be dissolved in the hydrogen peroxide solution and removed. Then, the R value (R value of the second carbon material) was measured. The R values of the samples are shown in the following Table 1. As shown in the following Table 1, in Nos. 1 to 5, the coating contained the second carbon material, and the second carbon material had a larger R value than the first carbon material.

2. Producing Lithium Ion Secondary Battery

Lithium ion secondary batteries were produced using the negative electrode active material particles obtained above.

Here, 98 parts by mass of the negative electrode active material particles, 1 part by mass of carboxymethyl cellulose, 1 part by mass of a styrene butadiene rubber, and water (solvent) were mixed to prepare a negative electrode paint. An amount of the solvent was adjusted so that a solid content proportion of the negative electrode paint became 55 mass %. A rolled copper (Cu) foil with a thickness of 10 μm was prepared. The negative electrode paint was applied to the surface of the Cu foil and dried. Thereby, a negative electrode active material layer was formed. The dried negative electrode active material layer had a basis weight (mass per unit area) of 5 mg/cm$^2$. Thereby, a negative electrode was produced. The negative electrode was cut so that the negative electrode active material layer had a planar size of 31 mm×31 mm. A tab lead was bonded to the Cu foil. Thereby, a negative electrode plate was produced.

$LiNi_{1/3}Co_{1/3}Mn_{1/3}O_2$ (average particle size: 5 μm) was prepared as positive electrode active material particles. Here, 85 parts by mass of the positive electrode active material particles, 12 parts by mass of acetylene black, 3 parts by mass of polyvinylidene fluoride, and N-methyl-2-pyrrolidone (solvent) were mixed to prepare a positive electrode paint. An aluminum (Al) foil with a thickness of 15 μm was prepared. The positive electrode paint was applied to the surface of the Al foil and dried. Thereby, a positive electrode active material layer was formed. The dried positive electrode active material layer had a basis weight of 11 mg/cm$^2$. Thereby, a positive electrode was produced. The positive electrode was cut so that the positive electrode active material layer had a planar size of 29 mm×29 mm. A tab lead was bonded to the Al foil. Thereby, a positive electrode plate was produced.

A separator (a porous film made of polyethylene) with a thickness of 20 μm was prepared. The separator was laminated between the negative electrode plate and positive electrode plate obtained above when facing each other. Thereby, an electrode group was produced. As an exterior member, a bag made of an aluminum laminate film was prepared. The electrode group was accommodated in the exterior member.

An electrolytic solution containing the following components was prepared.
Supporting electrolyte: $LiPF_6$ (1.0 mol/l)
Solvent: [EC:DMC:EMC=1:1:1 (volume ratio)]

Here, "EC" denotes ethylene carbonate, "DMC" denotes dimethyl carbonate, and "EMC" denotes ethyl methyl carbonate.

An electrolytic solution was injected into the exterior member. The exterior member was sealed. Thereby, a lithium ion secondary battery for evaluation (hereinafter abbreviated as a "battery" in some cases) was produced.

3. Measurement of Amount of a Gas Generated

An underwater weight (initial underwater weight) of the battery was measured. After measurement, the battery was left for 12 hours. Next, the battery was charged to 4.1 V at a constant current of 2 mA. The battery was discharged to 3.0 V at a constant current of 2 mA with a 30-minute pause therebetween. In all the samples, an initial charging capacity was about 14 mAh to 15 mAh. After charging and discharging, the underwater weight (the underwater weight after charging and discharging) of the battery was measured.

In this specification, a value calculated by the following formula:

[amount of a gas generated (unit: g)]=[initial underwater weight]−[underwater weight after charging and discharging]

was set as an amount of a gas generated.

It is thought that, when the battery was initially charged, a reductive decomposition reaction of the electrolytic solution occurred on the surface of the negative electrode active material particles, and a gas was generated. When a gas was generated in the battery, since a buoyancy was changed, the underwater weight of the battery was changed. Thus, the value calculated by the above formula may be an indicator of the amount of a gas generated.

The measurement results of the amount of a gas generated are shown in the following Table 1. The value shown in the following Table 1 is a relative value when the amount of a gas generated of No. *1 is set as 100%. A smaller an amount of gas generated indicates a greater reduction in reductive decomposition of the electrolytic solution.

4. Measurement of Battery Resistance

After the amount of a gas generated was measured, the voltage of the battery was adjusted to 3.7 V by constant current and constant voltage type charging (current during constant current charging=10 mA, voltage during constant voltage charging=3.7 V, and constant voltage charging time=2 hours). After charging, the battery was discharged for 10 seconds at a constant current of 300 mA with a 30-minute pause therebetween. An amount of voltage drop 10 seconds after discharging started was measured. A battery resistance was calculated by dividing the amount of voltage drop by a discharging current (300 mA). The results are shown in the following Table 1.

TABLE 1

| | | | (C) Forming coating (hydrothermal synthesis) | | | | (D) Heat treatment Inert atmosphere | | |
|---|---|---|---|---|---|---|---|---|---|
| | | (B) | | | | | | | |
| No. | (A) Preparation | Surface oxidation | ROTi | Organic compound | Deionized water | Temperature [° C.] | Time [h] | Atmosphere | Temperature [° C.] | Time [h] |
| *1 | Artificial graphite | — | — | — | — | — | — | — | — | — |
| *2 | Artificial graphite | Yes | TNBT | — | 100 mass % | 175 | 40 | $N_2$ | 600 | 8 |

TABLE 1-continued

List of samples

| No. | | | | | | | | | | |
|---|---|---|---|---|---|---|---|---|---|---|
| 1 | Artificial graphite | Yes | TNBT | EG 10 mass % | 90 mass % | 175 | 40 | $N_2$ | 600 | 8 |
| 2 | Artificial graphite | Yes | TNBT | EG 20 mass % | 80 mass % | 175 | 40 | $N_2$ | 600 | 8 |
| 3 | Artificial graphite | Yes | TNBT | EG 40 mass % | 60 mass % | 175 | 40 | $N_2$ | 600 | 8 |
| 4 | Artificial graphite | Yes | TNBT | EG 60 mass % | 40 mass % | 175 | 40 | $N_2$ | 600 | 8 |
| 5 | Artificial graphite | Yes | TNBT | EG 70 mass % | 30 mass % | 175 | 40 | $N_2$ | 600 | 8 |

| | (D) Heat treatment | | | R value | | Evaluation | |
|---|---|---|---|---|---|---|---|
| | Oxygen-containing atmosphere | | | First | Second | Battery | Amount of gas |
| No. | Atmosphere | Temperature [° C.] | Time [h] | carbon material | carbon material | resistance [Ω] | generated [%] |
| *1 | — | — | — | 0.16 | — | 1.08 | 100 |
| *2 | — | — | — | 0.17 | — | 1.61 | 83 |
| 1 | — | — | — | 0.17 | 0.38 | 1.22 | 83 |
| 2 | — | — | — | 0.17 | 0.44 | 1.15 | 85 |
| 3 | — | — | — | 0.17 | 0.51 | 1.13 | 78 |
| 4 | — | — | — | 0.17 | 0.53 | 1.12 | 85 |
| 5 | Air | 400 | 2 | 0.17 | 0.53 | 1.19 | 78 |

<Results>

No. *2 had a lower amount of a gas generated than No. *1. This is because the surface of the base material particles (artificial graphite) was covered with lithium titanate. However, No. *2 had a significantly higher battery resistance than No. *1. Contact between lithium titanate and the base material particles was point contact and there were thought to be fewer conduction paths for Li ions.

In No. 1, when the coating was formed (hydrothermal synthesis), EG (a raw material of the second carbon material) was added. An increase in battery resistance was reduced more in No. 1 than in No. *2. It was thought that the second carbon material contained in the coating supplemented contact points between lithium titanate and the base material particles so that the contact between lithium titanate and the base material particles became surface contacts, and conduction of Li ions occurred in many directions. That is, No. 1 was thought to have many conduction paths for Li ions than No. *2. In addition, when the surface was covered with lithium titanate, a reduction in electron conductivity was thought to be reduced by the second carbon material.

All of Nos. 1 to 5 showed a favorable battery resistance and amount of gas generated. In Nos. 1 to 5, a proportion of EG with respect to the total amount of EG and water was 10 mass % or more and 70 mass % or less.

No. 4 had a larger amount of gas generated than No. 3. Since a larger amount of EG (raw material of the second carbon material) than in No. 3 was supplied, a larger amount of the second carbon material was thought to be on the outermost surface of the coating.

In No. 5, while a larger amount of EG than in No. 4 was supplied, an amount of gas generated was smaller than in No. 4. In No. 5, after the heat treatment in an inert atmosphere, since the heat treatment was performed in an oxygen-containing atmosphere, an amount of the second carbon material on the outermost surface of the coating was thought to be reduced to the same amount as in No. 3.

The above embodiments and examples are only examples and should not be considered as restrictive. The technical scope defined by the scope of the claims includes meanings equivalent to the scope of the claims and all modifications within the scope of the claims.

What is claimed is:

1. Negative electrode active material particles for a lithium ion secondary battery, comprising:
    base material particles containing a first carbon material; and
    a coating covering a surface of the base material particles,
    wherein the coating contains lithium titanate and a second carbon material, and a ratio of an intensity of a D band in a region of 1330 to 1390 $cm^{-1}$ to an intensity of a G band in a region of 1550 to 1610 $cm^{-1}$ in a laser Raman spectrum is an R value,
    the R value of the first carbon material is 0.01 or more and 0.17 or less, and
    the R value of the second carbon material is 0.38 or more and 0.53 or less.

2. A method of producing negative electrode active material particles for a lithium ion secondary battery comprising:
    preparing base material particles containing a first carbon material;
    oxidizing a surface of the base material particles so that a hydrophilic group is introduced onto the surface of the base material particles; and
    forming a coating containing lithium titanate and a second carbon material on the surface of the base material particles onto which the hydrophilic group is introduced by a hydrothermal reaction,
    wherein the coating is formed to cover the surface of the base material particles, and ratio of an intensity of a D band in a region of 1330 to 1390 $cm^{-1}$ to an intensity of a G band in a region of 1550 to 1610 $cm^{-1}$ in a laser Raman spectrum is an R value, the second carbon material has a larger R value than the first carbon material.

3. The method according to claim 2, further comprising after the coating is formed, heating the coating, and thus reducing the second carbon material on an outermost surface of the coating.

4. The method according to claim 2, wherein the second carbon material is synthesized by a hydrothermal reaction of an organic compound.

5. The method according to claim 4, wherein the organic compound is ethylene glycol.

6. The method according to claim 2, wherein the lithium titanate is synthesized by a hydrothermal reaction between a lithium compound and titanium alkoxide.

7. The method according to claim 6, wherein the titanium alkoxide is tetra-n-butyl titanate.

* * * * *